(12) United States Patent
Yan (10) Patent No.: US 11,439,061 B2
(45) Date of Patent: Sep. 13, 2022

(54) HAND-PROPELLED, SELF-DRIVING, TRAVELING MACHINE

(71) Applicant: Nanjing Chervon Industry Co., Ltd., Nanjing (CN)

(72) Inventor: Yu Yan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 339 days.

(21) Appl. No.: 16/861,949

(22) Filed: Apr. 29, 2020

(65) Prior Publication Data

US 2020/0253114 A1 Aug. 13, 2020

Related U.S. Application Data

(63) Continuation of application No. PCT/CN2017/118360, filed on Dec. 25, 2017.

(30) Foreign Application Priority Data

Nov. 8, 2017 (CN) .......................... 201711092726.2

(51) Int. Cl.
*A01D 34/68* (2006.01)
*F16D 41/06* (2006.01)
(Continued)

(52) U.S. Cl.
CPC ......... *A01D 34/6812* (2013.01); *A01D 34/69* (2013.01); *A01D 69/06* (2013.01);
(Continued)

(58) Field of Classification Search
CPC .... A01D 34/6812; B62D 11/08; B62D 51/04; F16D 2041/0665
See application file for complete search history.

(56) References Cited

U.S. PATENT DOCUMENTS

| 4,205,509 A | 6/1980 | Miyazawa et al. |
| 4,466,233 A | 8/1984 | Thesman |

(Continued)

FOREIGN PATENT DOCUMENTS

| CN | 201752182 U | 3/2011 |
| CN | 103202136 A | 7/2013 |

(Continued)

OTHER PUBLICATIONS

ISA/CN, Int. Search Report issued on PCT application No. CN2017/118360, dated Aug. 8, 2018, 3 pages.

*Primary Examiner* — David R Morris
(74) *Attorney, Agent, or Firm* — Greenberg Traurig, LLP (57) ABSTRACT

A hand-propelled, self-driving, traveling machine that includes a clutch which enables transmission between a wheel and a transmission shaft. The clutch provides a drive state in which the transmission shaft drives the wheel to rotate and an unlocked state in which the wheel is rotatable relative to the transmission shaft. The clutch includes a driving member, combined with the transmission shaft, a movable pin, movable between a locked position in which the clutch is in the drive state and an unlocked position in which the clutch is in the unlocked state, a transmission member connected to the wheel, a movable friction member provided with a limiting slot, where the movable pin is partially disposed in the limiting slot, and a fixed friction member that is fixed to the chassis and that is in a frictional contact with the movable friction member.

20 Claims, 11 Drawing Sheets

(51) Int. Cl.
  *A01D 34/69* (2006.01)
  *A01D 69/06* (2006.01)
  *A01D 69/08* (2006.01)
  *B62D 11/08* (2006.01)
  *B62D 51/04* (2006.01)
  *F16D 41/08* (2006.01)
  *A01D 69/02* (2006.01)
  *A01D 101/00* (2006.01)
  *B62D 51/06* (2006.01)
  *F16D 41/066* (2006.01)
  *B62B 5/00* (2006.01)
  *E01H 5/04* (2006.01)

(52) U.S. Cl.
  CPC .............. *A01D 69/08* (2013.01); *B62D 11/08* (2013.01); *B62D 51/04* (2013.01); *F16D 41/088* (2013.01); *A01D 69/02* (2013.01); *A01D 2101/00* (2013.01); *B62B 5/0026* (2013.01); *B62D 51/06* (2013.01); *E01H 5/04* (2013.01); *F16D 2041/0665* (2013.01)

(56) References Cited

U.S. PATENT DOCUMENTS

| | | | |
|---|---|---|---|
| 10,524,417 B2 * | 1/2020 | Fan | A01D 34/69 |
| 10,605,314 B2 * | 3/2020 | Vaughn | A01D 34/69 |
| 2019/0223378 A1 * | 7/2019 | Fan | A01D 34/6818 |
| 2019/0301544 A1 * | 10/2019 | Vaughn | F16H 3/10 |
| 2020/0053960 A1 * | 2/2020 | Fan | A01D 69/08 |

FOREIGN PATENT DOCUMENTS

| | | |
|---|---|---|
| CN | 104145616 A | 11/2014 |
| CN | 105830625 A | 8/2016 |
| CN | 105981528 A | 10/2016 |
| CN | 106584370 A | 4/2017 |

\* cited by examiner

HAND-PROPELLED, SELF-DRIVING, TRAVELING MACHINE

RELATED APPLICATION INFORMATION

This application is a continuation of International Application Number PCT/CN2017/118360, filed on Dec. 25, 2017, through which this application also claims the benefit under 35 U.S.C. § 119(a) of Chinese Patent Application No. CN 201711092726.2, filed on Nov. 8, 2017, each of which is incorporated by reference in its entirety herein.

TECHNICAL FIELD

The present disclosure relates to a hand-propelled, self-driving, traveling machine.

BACKGROUND

Lawn mowers, snowplows, and the like are common examples of a hand-propelled, self-driving, traveling machine. A hand-propelled, self-driving, traveling machine includes a motor, a wheel, and a transmission mechanism. The motor drives the wheels to rotate through the transmission mechanism, thereby driving the hand-propelled, self-driving, traveling machine to move relative to the ground.

When taking a turn, the left wheel and the right wheel of the hand-propelled, self-driving, traveling machine need to rotate at different rotational speeds. A conventional hand-propelled, self-driving, traveling machine is provided with a clutch to allow the left and right wheels to rotate asynchronously, and optionally the wheel on one side may travel at a rotational speed greater than the wheel on the other side. The clutch that accomplishes such function is also called a differential. When a motor shaft of such a conventional, hand-propelled, self-driving, traveling machine equipped with a clutch stops rotating and the user pushes the hand-propelled, self-driving, traveling machine forward to make the wheel continue rotating forward, the clutch may disconnect the transmission between the wheel and the motor shaft. When the motor shaft stops rotating, the user pulls the hand-propelled, self-driving, traveling machine backward to make the wheel rotate backwards, the clutch will not be able to disconnect the transmission between the wheel and the motor shaft, such that the wheel will drive the motor shaft to rotate. At this point, the user needs to exert a relatively large force in order to pull the hand-propelled, self-driving, traveling machine backward. This phenomenon is called a "lock-up". The differential is kept in a drive state. After the motor stops, in order to disconnect the transmission between the wheel and the motor shaft, the user needs to push the hand-propelled, self-driving, traveling machine forward to achieve "unlocking", even if the differential is already unlocked. Only after the "unlocking" is done can the wheel rotate freely relative to the motor shaft. Thus, pulling the hand-propelled, self-driving, traveling machine backward cannot "unlock" the machine, which brings great inconvenience to the user.

SUMMARY

In one aspect of the disclosure, a hand-propelled, self-driving, traveling machine includes a chassis; a handle that is configured to be pushed by a user and that is connected to the chassis; a wheel, configured to support the chassis and rotatable relative to the chassis; a motor, including a motor shaft configured for driving the wheel to rotate; a transmission shaft, driven to rotate by the motor shaft; and a clutch that enables transmission between the wheel and the transmission shaft. The clutch has a drive state where the transmission shaft is operative to drive the wheel to rotate and an unlocked state where the wheel is rotatable relative to the transmission shaft. The clutch includes: a driving member combined with the transmission shaft or constituting a part of the transmission shaft and configured to rotate synchronously with the transmission shaft; a movable pin, movable relative to the driving member between a locked position in which the clutch is in the drive state and an unlocked position in which the clutch is in the unlocked state; a transmission member, connected to the wheel and configured to drive the wheel to rotate; a movable friction member, provided with a limiting slot, where the movable pin is partially disposed in the limiting slot, and the movable pin is rotatable synchronously with the movable friction member; and a fixed friction member, fixed to the chassis or constituting a part of the chassis, where the fixed friction member is in a frictional contact with the movable friction member.

In accordance with an example, the transmission member is provided with a mounting groove; the driving member and the movable pin are disposed in the mounting groove; and the driving member is formed with a driving surface that is in contact with the movable pin to drive the movable pin to move; when the movable pin is in the locked position, the movable pin is in contact with both the driving surface and a groove wall of the mounting groove; when the movable pin is in the unlocked position, the movable pin is free of contact with at least one of the driving surface and the groove wall of the mounting groove.

In accordance with an example, the driving member is formed with a driving surface configured for driving the movable pin to rotate in a first direction, and is further formed with a stop surface configured for stopping the movable pin from rotating relative to the driving member in the first direction.

In accordance with an example, the limiting slot is configured to guide the movable pin to move in a radial direction around a rotational axis of the driving member.

In accordance with an example, the hand-propelled, self-driving, traveling machine includes two of the clutches, which are arranged at two ends of the transmission shaft.

In accordance with an example, the hand-propelled, self-driving, traveling machine further includes an elastic member configured for applying a force to the movable friction member to drive the movable friction member to come into contact with the fixed friction member.

In accordance with an example, the elastic member is disposed between the movable friction member and the driving member.

In accordance with an example, the fixed friction member is sleeved onto an outer periphery of the transmission shaft.

In accordance with an example, the wheel is formed with or connected to a driven gear, the transmission member is formed with or connected to a drive gear, and the drive gear is meshed with the driven gear.

In accordance with an example, the hand-propelled, self-driving, traveling machine includes a second motor connected to the chassis, and a working accessory driven by the second motor to perform a tool function.

In accordance with an example, the hand-propelled, self-driving, traveling machine includes a working accessory driven by the motor to perform a tool function.

In accordance with an example, the transmission shaft is operative to be controlled to rotate in two different directions; when the motor drives the transmission shaft to rotate in a first rotational direction, the transmission shaft is operative to drive the wheel to rotate; and when the motor drives the transmission shaft to rotate in a second rotational direction opposite to the first rotational direction, the movable member is operative to move to the unlocked position causing the clutch to enter the unlocked state.

In another aspect of the disclosure, a hand-propelled, self-driving, traveling machine that includes: a chassis; a handle configured to be pushed by a user and connected to the chassis; a wheel, configured to support the chassis and rotatable relative to the chassis; a motor, including a motor shaft configured for driving the wheel to rotate; and a clutch arranged between the wheel and the motor shaft. The clutch has a drive state where the motor shaft is operative to drive the wheel to rotate and an unlocked state where the wheel is rotatable relative to the motor shaft. The clutch includes: a movable member that is movable between a locked position in which the clutch is in the drive state and an unlocked position in which the clutch is in the unlocked state; a fixed friction member fixed to the chassis or constituting a part of the chassis. When the clutch is in the unlocked state, the fixed friction member is operative to keep the movable member in the unlocked position by a frictional force. When the clutch is in the drive state, the motor shaft outputs a force that drives the movable member to rotate and that is greater than the frictional force exerted by the fixed friction member on the movable member, and the motor shaft is operative to drive the movable member to rotate relative to the fixed friction member.

In accordance with an example, the clutch further includes a movable friction member, the movable member is movably mounted onto the movable friction member, and the fixed friction member is in a frictional contact with the movable friction member.

In accordance with an example, the hand-propelled, self-driving, traveling machine further includes an elastic member configured for applying a force to the movable friction member to drive the movable friction member to come into contact with the fixed friction member.

In accordance with an example, the movable friction member is disposed between the fixed friction member and the elastic member.

In accordance with an example, the elastic member is a spiral spring, the clutch includes a plurality of the movable members, and the plurality of movable members are disposed to surround the elastic member.

In accordance with an example, the clutch includes a plurality of the movable members, and the plurality of movable members are movably mounted onto the movable friction member.

In accordance with an example, the hand-propelled, self-driving, traveling machine further includes a transmission shaft, driven to rotate by the motor shaft, and the clutch further includes: a driving member, combined with or constituting a part of the transmission shaft and configured to rotate synchronously with the transmission shaft; a transmission member, connected to the wheel and configured to drive the wheel to rotate, where the transmission member is formed with a mounting groove and the driving member and the movable member are disposed in the mounting groove. The driving member is formed with a driving surface that is in contact with the movable member and operative to drive the movable member to move. When the movable member is in the locked position, the movable member is in contact with both the driving surface and a groove wall of the mounting groove. When the movable member is in the unlocked position, the movable member is free of contact with the driving surface, or the groove wall of the mounting groove, or with both the driving surface and the groove wall of the mounting groove.

In accordance with an example, the driving member is formed with a driving surface configured for driving the movable member to rotate in a first direction, and is further formed with a stop surface configured for stopping the movable member from rotating relative to the driving member in the first direction.

In accordance with an example, the driving member is formed with a plurality of driving surfaces, where the number of the plurality of driving surfaces is equal to that of the movable members.

In accordance with an example, the movable friction member includes a frame member and a friction member fixed to the frame member, the friction member is in a frictional contact with the fixed friction member; and the movable member is movably mounted onto the frame member.

In accordance with an example, the friction member is made of a rubber material and is ring-shaped.

In accordance with an example, the motor is an electric motor, and the hand-propelled, self-driving, traveling machine is an electric snowplow or an electric lawn mower.

The present disclosure is beneficial in that the clutch of the hand-propelled, self-driving, traveling machine has a high reliability, and the movable pin is not easy to fall when moving in the locked position and the unlocked position. The movable friction member may keep the movable pin upright when the movable pin moves in the locked position and the unlocked position, preventing the clutch from failing due to tipping. When the clutch is in the unlocked state, the fixed friction member may keep the movable member in the unlocked position by friction, thereby preventing the clutch from disengaging from the unlocked state due to displacement of the movable member. When the clutch is in the drive state, the fixed friction member exerts a frictional force onto the movable member to keep the movable member in the locked position thus preventing the movable member from moving and generating noise. The clutch of the hand-propelled, self-driving, traveling machine may realize automatic unlocking by controlling a reverse rotation of the drive shaft.

DETAILED DESCRIPTION

As illustrated in FIGS. 1 to 4, a hand-propelled, self-driving, traveling machine 100 includes a chassis 10, a handle 20, a wheel 30, a motor 40, and a transmission mechanism 50. The hand-propelled, self-driving, traveling machine 100 may also be referred to as a power tool.

The chassis 10 is used for mounting the motor 40. The wheel 30 is used to support the chassis 10. The wheel 30 is in contact with the ground, is rotatable relative to the chassis 10 about a first axis 102, so that the hand-propelled, self-driving, traveling machine 100 may move relative to the ground. The handle 20 is connected to the chassis 10, and a user may push the handle 20 to make the chassis 10 move relative to the ground, thereby driving the hand-propelled, self-driving, traveling machine 100 to move relative to the ground. The handle 20 is operated and controlled by the user to control the hand-propelled, self-driving, traveling machine 100.

Figure 1:
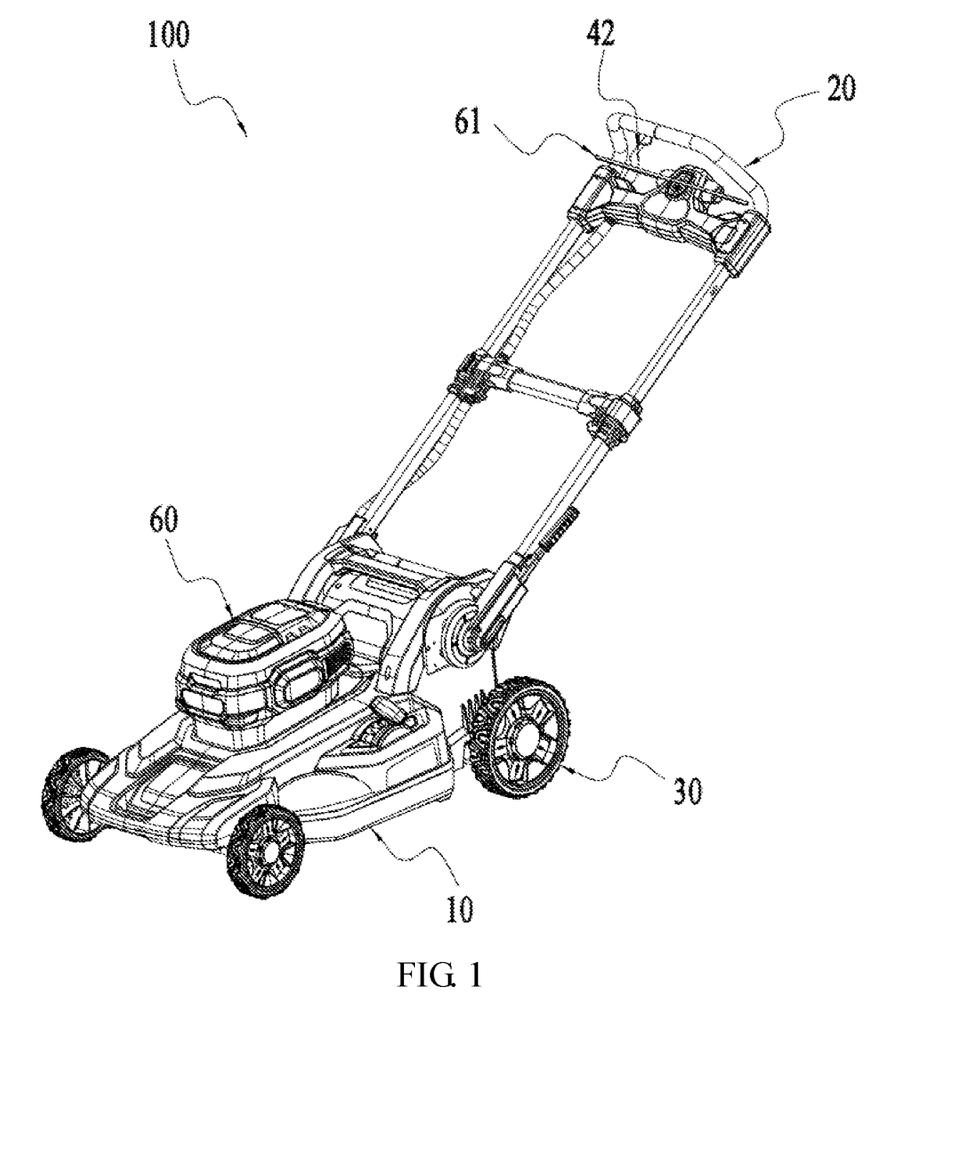
FIG. 1 is a perspective view of a hand-propelled, self-driving, traveling machine in accordance with the present disclosure.

The hand-propelled, self-driving, traveling machine 100 includes a working accessory 70 used to perform a tool function. As a specific implementation, the working accessory 70 is a lawn mower blade, and the hand-propelled, self-driving, traveling machine 100 is a lawn mower. The chassis 10 is provided with a cutting cavity 11. The lawn mower blade is configured to rotate inside the cutting cavity. As another implementation, the working accessory is a snowplow paddle, and the hand-propelled, self-driving, traveling machine is a snowplow.

In an optional example, the working accessory and the wheel may be driven by the same motor. That is, the motor is configured to drive both the working accessory and the wheel.

In a specific example, the working accessory 70 and the wheel 30 are driven by different motors. Optionally, the hand-propelled, self-driving, traveling machine 100 includes a second motor 60 that is mounted to the chassis 10 and is configured to drive the working accessory 70. The second motor 60 may be an internal combustion engine powered by fuel combustion, or a motor powered by electricity. Optionally, the second motor 60 may be an electric motor. The battery pack is configured to supply power to the second motor 60. As illustrated in FIG. 1, the hand-propelled, self-driving, traveling machine 100 includes a second trigger 61 and a first trigger 42. The second trigger 61 is used to start the second motor 60, while first trigger 42 is used to start the motor 40. When the hand-propelled, self-driving, traveling machine 100 is a lawn mower, the second motor 60 may also be referred to as a lawn mower motor. The lawn mower motor is configured to drive the lawn mower blade to rotate. When powered by electricity, the lawn mower motor may also be referred to as a lawn mower electric motor.

Figure 2:
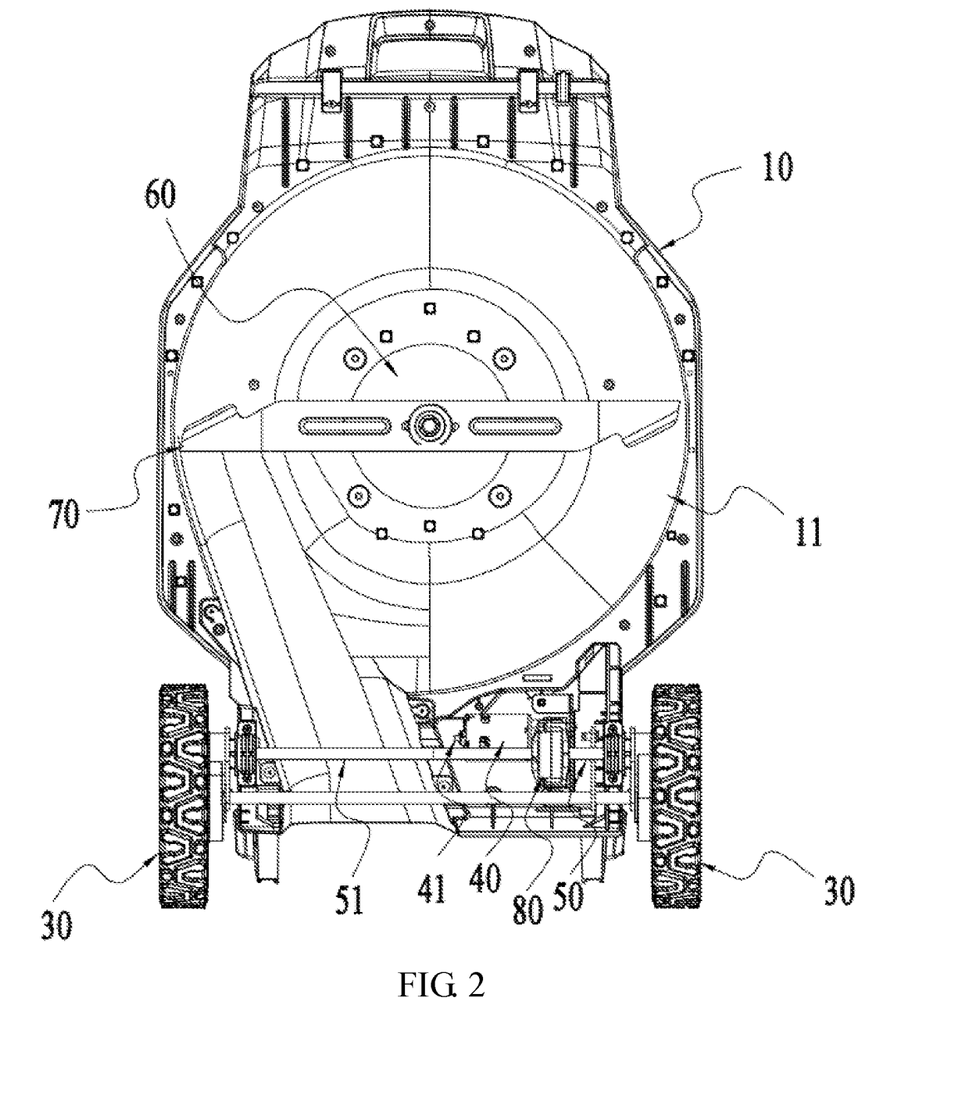
FIG. 2 is a schematic diagram illustrating a chassis, a motor, a transmission mechanism, and a wheel of the hand-propelled, self-driving, traveling machine of FIG. 1.
Figure 3:
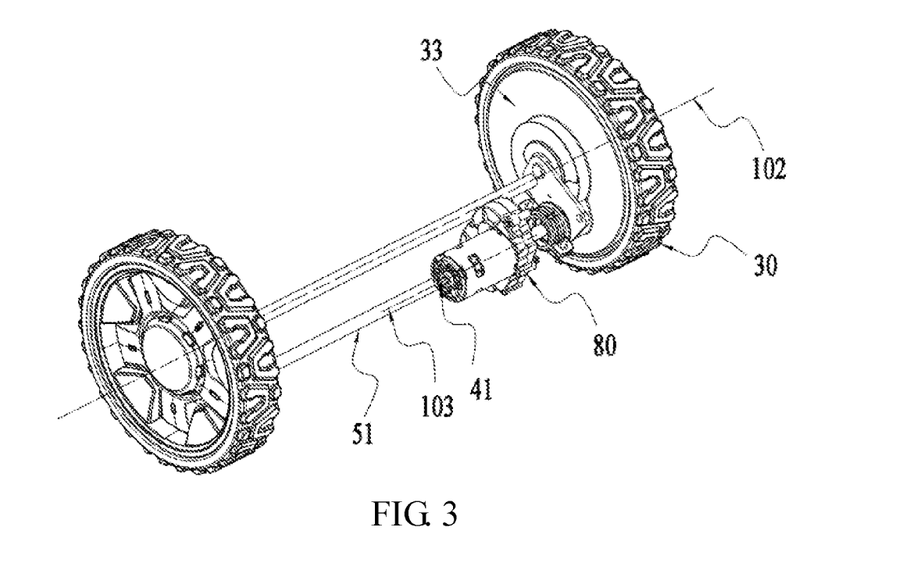
FIG. 3 is a schematic diagram illustrating the motor driving the wheel to rotate in FIG. 2.
Figure 4:
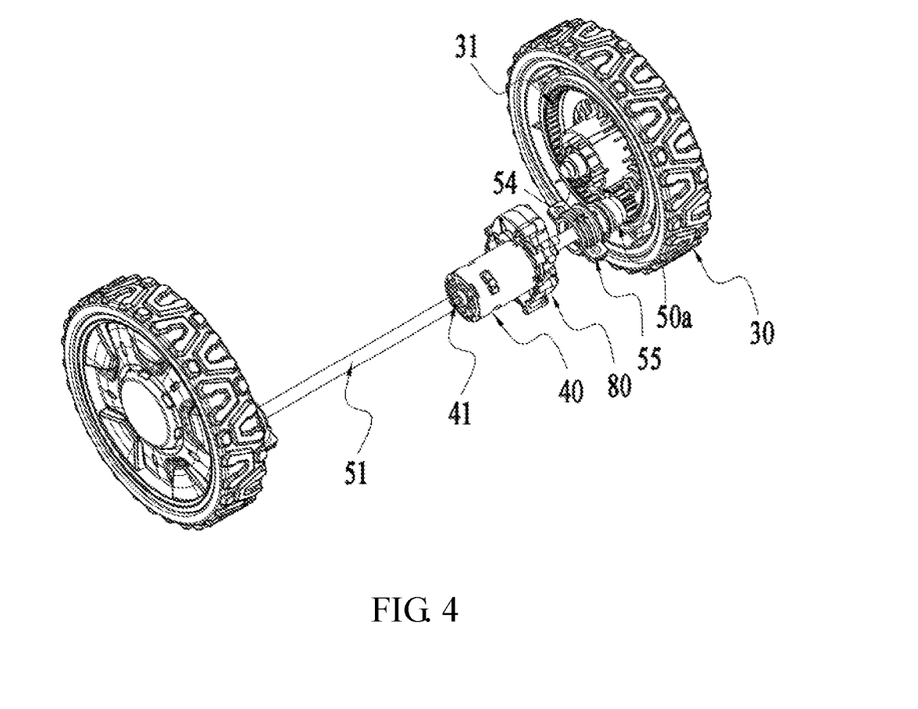
FIG. 4 is a schematic diagram illustrating the motor, the transmission mechanism, and the wheel of FIG. 3.

The motor 40 includes a motor shaft 41. A rotational axis 103 of the motor shaft 41 is parallel to the first axis 102. The motor shaft 41 is configured to drive the wheel 30 to rotate. In a specific example, the motor 40 is an electric motor. The motor shaft 41 is an electric motor shaft 41. The motor 40 may also be referred to as a self-propelled motor. The hand-propelled, self-driving, traveling machine 100 further includes the battery pack for supplying power to the motor 40. In an optional example, the motor may also be an internal combustion engine powered by fuel combustion.

The transmission mechanism 50 is configured to transmit power between the motor 40 and the wheel 30. The transmission mechanism 50 connects the motor shaft 41 to the wheel 30, thereby enabling transmission between the motor shaft 41 and the wheel 30.

The transmission mechanism 50 may further include a transmission shaft 51, a clutch 50a, and a gear box 80.

The transmission shaft 51 is driven by the motor shaft 41 to rotate about a central axis 101, thereby driving the wheel 30 to rotate. The gear box 80 connects the transmission shaft 51 to the motor shaft 41, enabling the motor shaft 41 to drive the transmission shaft 51 to rotate. The transmission shaft 51 and the motor shaft 41 rotate synchronously. A rotational speed of the transmission shaft 51 is less than that of the motor shaft 41. The central axis 101 is parallel to the rotational axis 103 of the motor shaft 41, and is parallel to the first axis 102.

The clutch 50a has a drive state and an unlocked state. In the drive state, the motor shaft 41 is operative to drive the wheel 30 to rotate. In the unlocked state, the wheel 30 may rotate freely relative to the motor shaft 41; that is, when the wheel 30 rotates clockwise or counterclockwise, the wheel 30 is not operative to drive the motor shaft 41 to rotate.

Figure 5:
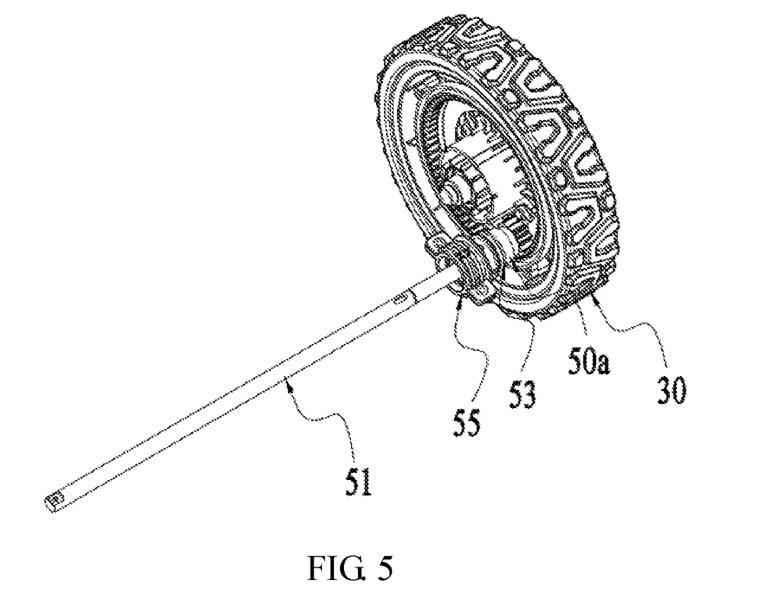
FIG. 5 is a schematic diagram illustrating a drive shaft driving the wheel to rotate in FIG. 4.
Figure 6:
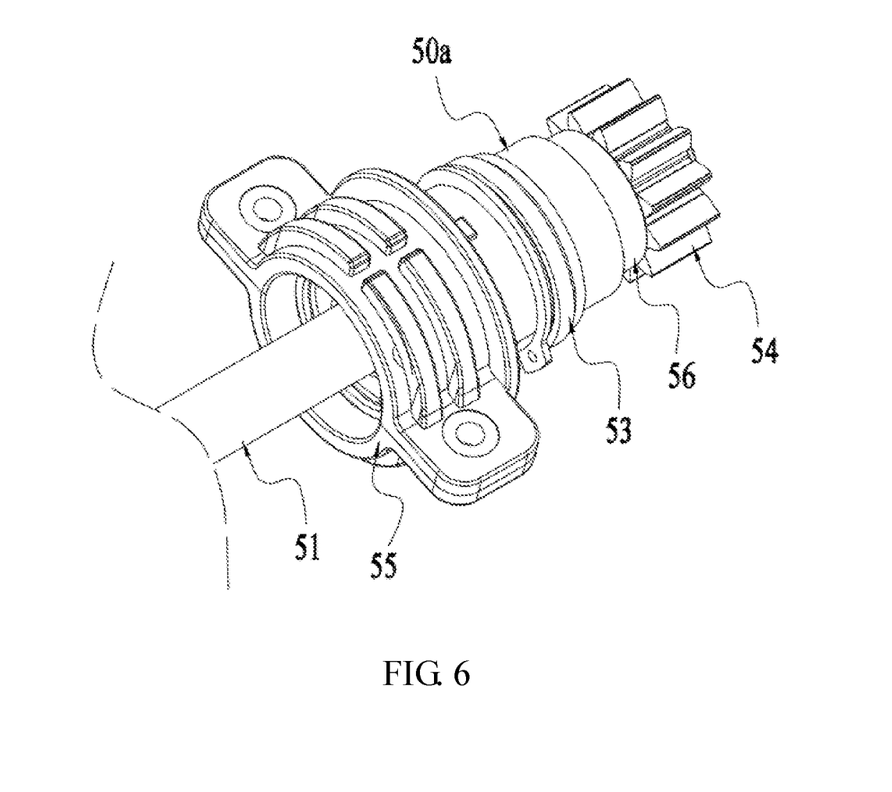
FIG. 6 is a schematic diagram illustrating a clutch and the transmission shaft of FIG. 5.
Figure 7:
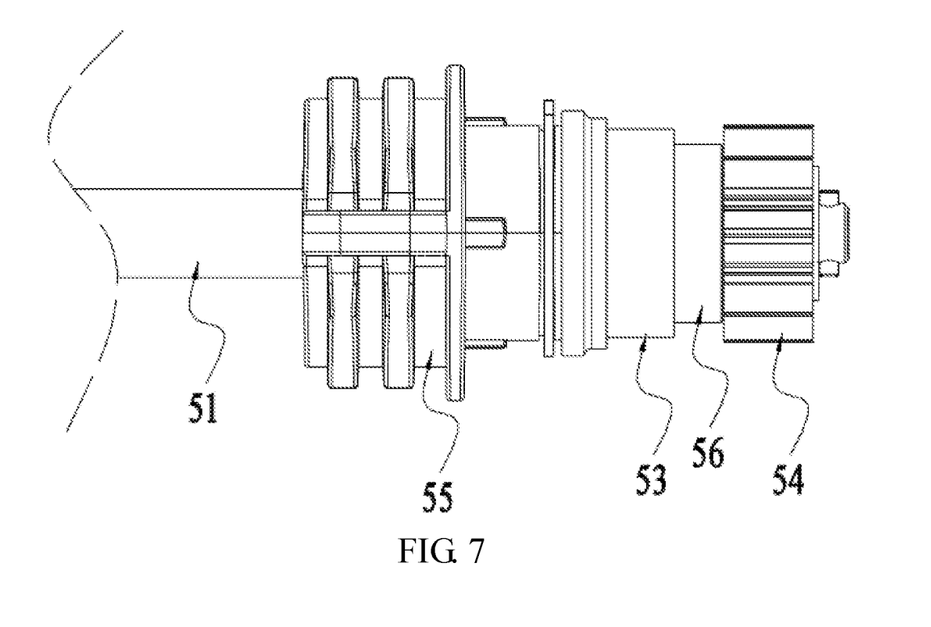
FIG. 7 is a plan view of the structure illustrated in FIG. 6.

The clutch 50a is provided between the wheel 30 and the motor shaft 41. In other words, the clutch 50a is disposed on a transmission path between the motor shaft 41 and the wheel 30. The clutch 50a realizes transmission between the transmission shaft 51 and the wheel 30. When the clutch 50a is in the drive state, the transmission shaft 51 is operative to drive the wheel 30 to rotate. When the clutch 50a is in the unlocked state, the wheel 30 is rotatable relative to the transmission shaft 51. Two clutches 50a are provided at two ends of the transmission shaft 51.

Figure 11:
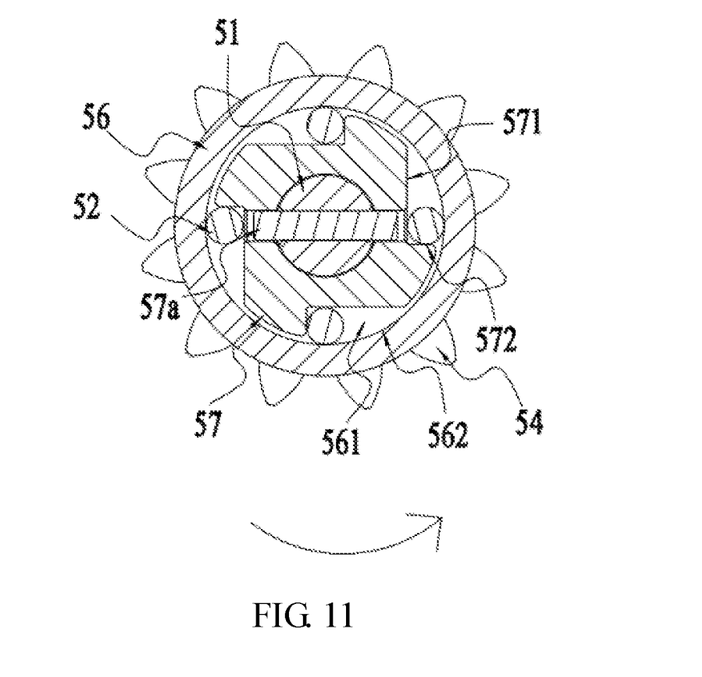
FIG. 11 is a schematic diagram illustrating the movable member of the clutch of FIG. 6 in an unlocked position.
Figure 12:
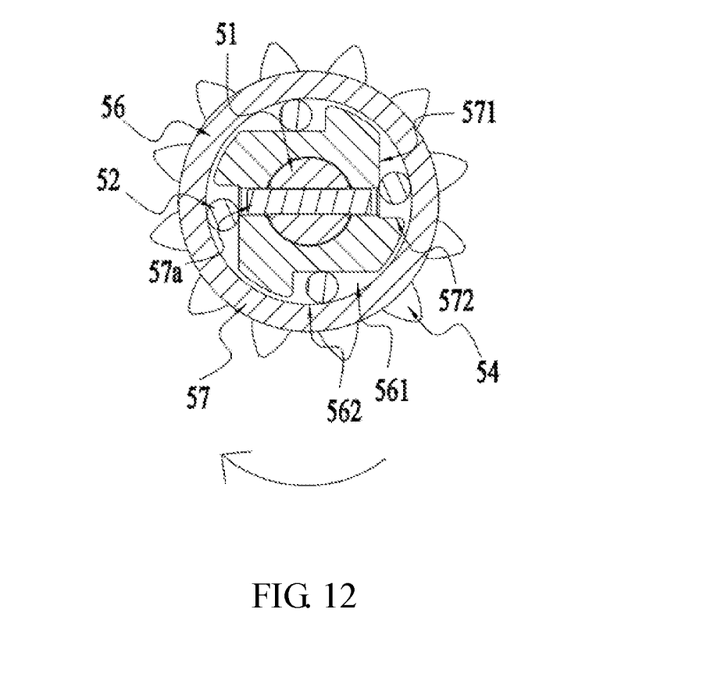
FIG. 12 is a schematic diagram illustrating the movable member of the clutch of FIG. 6 in a locked position.

As illustrated in FIGS. 5 to 10, the clutch 50a includes a movable member 52, a movable friction member 53, a fixed friction member 55, a transmission member 56, and a driving member 57. The movable member 52 moves between the locked position where the clutch 50a is in the drive state and the unlocked position where the clutch 50a is in the unlocked state. In FIG. 11, the movable member 52 is located in the unlocked position. In FIG. 12, the movable member 52 is located in the locked position. As a specific implementation, the movable member 52 is a movable pin. Optionally, the movable member 52 is a cylindrical pin.

The movable member 52 is mounted to the movable friction member 53. The movable member 52 is coupled to the movable friction member 53. The movable member 52 rotates synchronously with the movable friction member 53.

Figure 8:
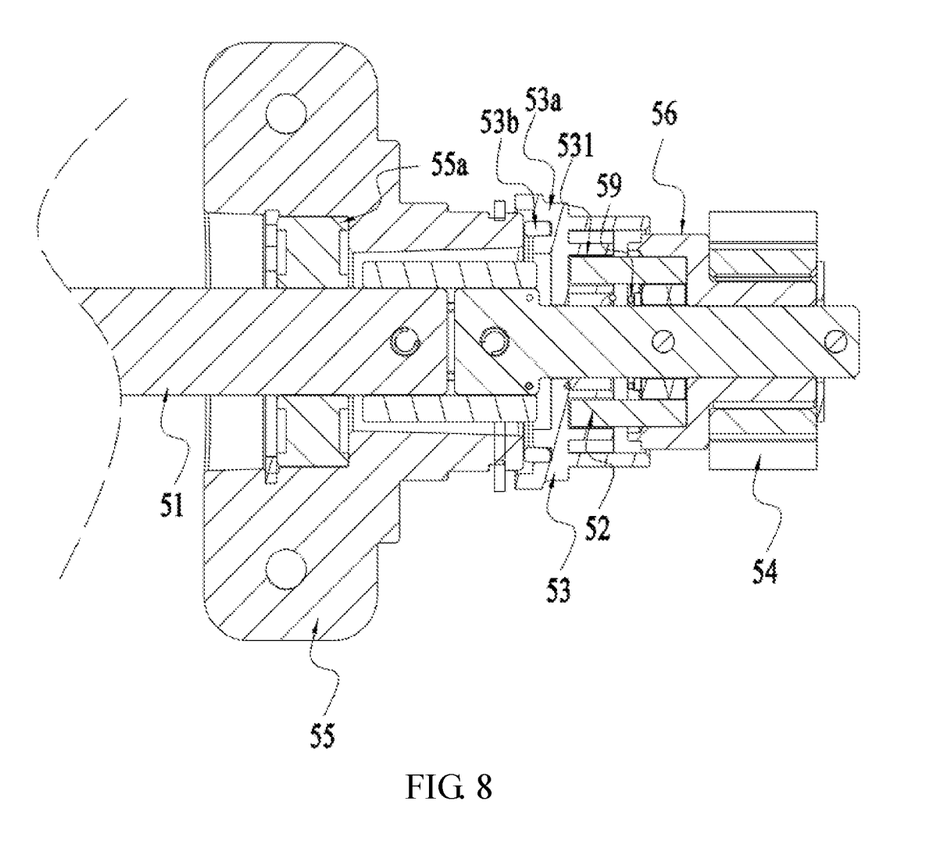
FIG. 8 is a cross-sectional view of the structure illustrated in FIG. 7.
Figure 9:
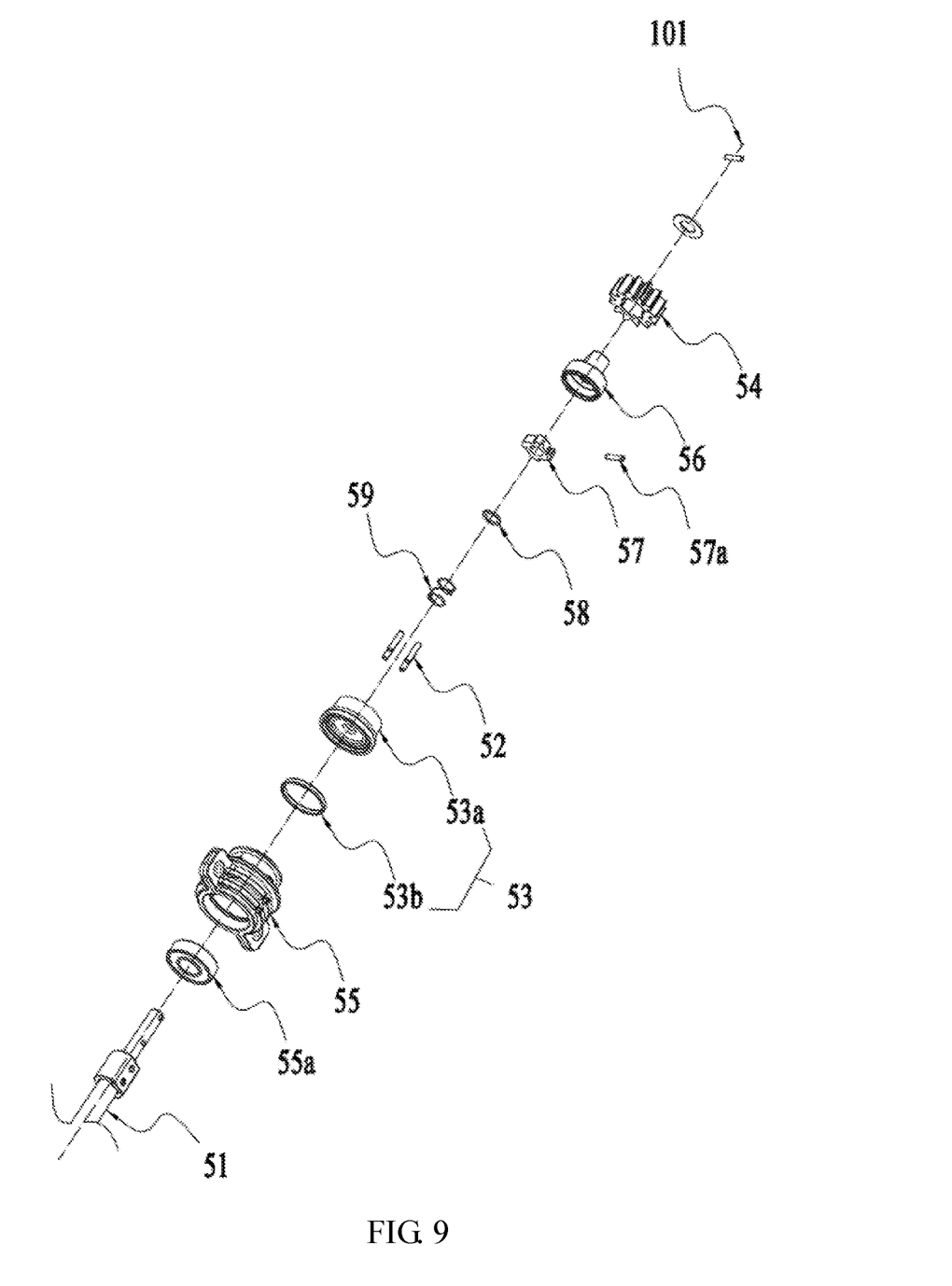
FIG. 9 is an exploded view of the structure illustrated in FIG. 6.
Figure 14:
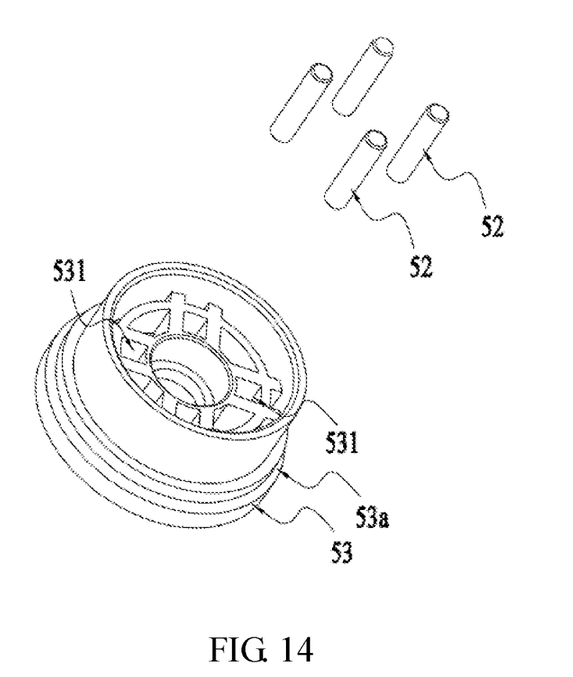
FIG. 14 is a schematic diagram illustrating a movable friction member and the movable member of FIG. 10.

Optionally, as illustrated in FIGS. 8 and 14, the movable friction member 53 is provided with a limiting slot 531, where a part of the movable member 52 is disposed in the limiting slot 531.

The limiting slot 531 guides a radial movement of the movable member 52 around a rotational axis of the driving member 57. Along a circumference around the rotational axis of the driving member 57, the movable member 52 rotates synchronously with the movable friction member 53. When the movable member 52 is the movable pin, the movable friction member 53 keeps the movable pin from moving relative to the movable friction member 53 in the circumferential direction of the rotational axis of the driving member 57, by means of the limiting slot 531. The movable friction member 53 limits the movable pin and prevents the movable pin from falling when the movable pin moves between the locked position and the unlocked position, which may otherwise cause failure of the clutch 50a.

The fixed friction member 55 and the movable friction member 53 are in a frictional contact with each other. Optionally, the fixed friction member 55 is fixed to the chassis 10. The fixed friction member 55 is sleeved onto an outer periphery of the transmission shaft 51. The transmission shaft 51 rotates relative to the fixed friction member 55. The fixed friction member 55 is configured to support the transmission shaft 51. The bearing 55a is sleeved onto the outer periphery of the transmission shaft 51. The bearing 55a is disposed between the transmission shaft 51 and the fixed friction member 55.

As an optional example, the fixed friction member constitutes a part of the chassis. In other words, the movable friction member is in a frictional contact with the chassis.

When the clutch 50a is in the unlocked state, the fixed friction member 55 is configured to keep the movable member 52 in the unlocked position by a frictional force. When the movable member 52 is in the unlocked position, since the movable member 52 is not subjected to a circumferential force along the rotational axis of the driving member 57, the fixed friction member 55 only needs to apply a small frictional force to the movable member 52 to ensure that the movable member 52 not move along the circumferential direction of the rotational axis of the driving member 57. At this moment, the frictional force of the fixed friction member 55 applied to the movable member 52 is a static frictional force. That is, when the hand-propelled, self-driving, traveling machine 100 is subjected to an unexpected force such as an impact, the frictional force may effectively ensure that the movable member 52 will stay in the unlocked position.

When the clutch 50a is in the drive state, the movable member 52 is in the locked position, and the force of the motor shaft 41 for driving the movable member 52 to rotate is greater than the frictional force exerted by the fixed friction member 55 on the movable member 52. The motor shaft 41 drives the movable member 52 to rotate relative to the fixed friction member 55. Similarly, during the rotation of the movable member 52, the fixed friction member 55 applies a dynamic frictional force to the movable member 52, the frictional force exerted by the fixed friction member 55 on the movable member 52 keeps the movable member 52 in the locked position, which may effectively reduce shaking of the movable member 52 and noise. Optionally, the movable member 52 is coupled to the movable friction member 53. The movable friction member 53 and the fixed friction member 55 are in a frictional contact with each other. An acting force of the fixed friction member 55 applied to the movable member 52 is transmitted to the movable member 52 via the movable friction member 53.

As an optional example, the fixed friction member may be in a direct frictional contact with the movable member. The movable member moves relative to the fixed friction member.

As a specific example, the clutch 50a further includes an elastic member 59. The elastic member 59 applies a force to the movable friction member 53 to drive the movable friction member 53 to come into contact with the fixed friction member 55. The elastic member 59 keeps the movable friction member 53 and the fixed friction member 55 in contact, so that a stable frictional force is created between the fixed friction member 55 and the movable friction member 53.

The movable friction member 53 is located between the fixed friction member 55 and the elastic member 59. Optionally, one end of the elastic member 59 is in contact with a gasket 58, and the other end of the elastic member 59 is in contact with the movable friction member 53. The gasket 58 is disposed between the elastic member 59 and the driving member 57. Optionally, the elastic member 59 is a spiral spring. The clutch 50a includes a plurality of movable members 52. The plurality of movable members 52 surround the driving member 57. The plurality of movable members 52 surround the elastic member 59. The plurality of movable members 52 are distributed along the circumference of the elastic member 59. The plurality of movable members 52 are movably mounted to the movable friction member 53.

Figure 10:
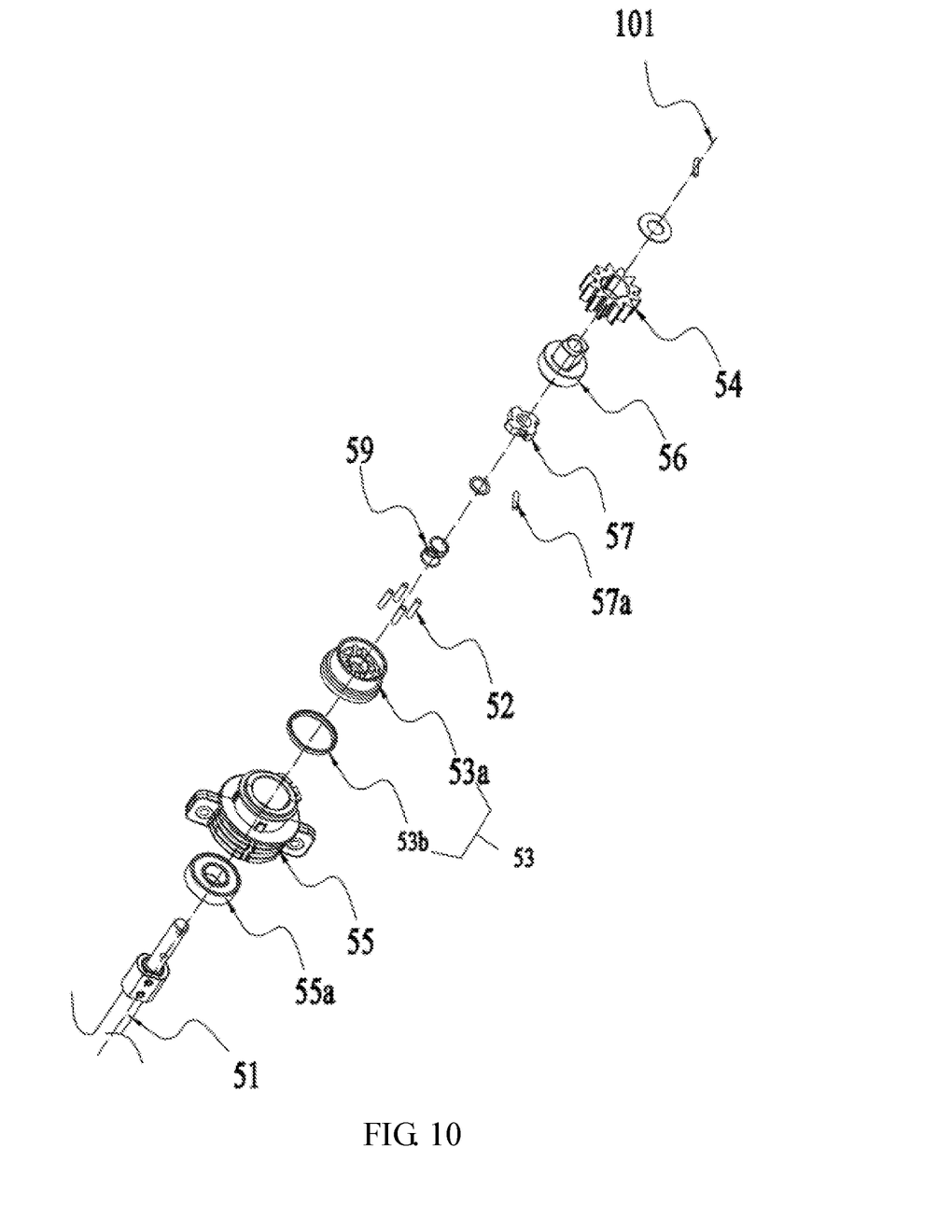
FIG. 10 is an exploded view of the structure illustrated in FIG. 6 taken from another perspective.

As a specific example, as illustrated in FIGS. 10 and 14, the movable friction member 53 includes a frame member 53a and a friction member 53b. The friction member 53b is fixed to the frame member 53a. The movable member 52 is movably mounted to the frame member 53a. The frame member 53a is provided with a limiting slot 531. The friction member 53b may be made of a rubber material and is ring-shaped.

As an optional example, the movable friction member is used as a unitary component. The frame member and the friction member are an integrity.

Figure 15:
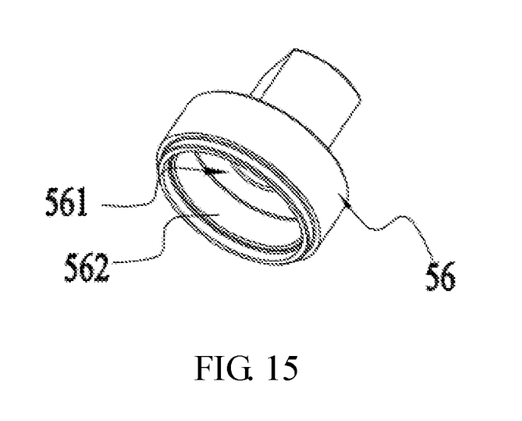
FIG. 15 is a schematic diagram illustrating a transmission member of FIG. 9.

The driving member 57 is coupled to the transmission shaft 51. The driving member 57 rotates synchronously with the transmission shaft 51. As a specific example, the driving member 57 is sleeved onto the outer periphery of the transmission shaft 51. The driving member 57 is fixed to the transmission shaft 51 via a fixed pin 57a running through the driving member 57 and the transmission shaft 51. As an optional example, the driving member and the transmission shaft use flattened position transmission. As an optional example, the driving member may constitute a part of the transmission shaft, namely the driving member and the transmission shaft are an integrity. The transmission member 56 is connected to the wheel 30, and is configured to drive the wheel 30 to rotate. As illustrated in FIGS. 11 and 15, the transmission member 56 is provided with a mounting groove 561, and the driving member 57 and the movable member 52 are disposed in the mounting groove 561. The driving member 57 is formed with a driving surface 571 that is in contact with the movable member 52 and that is operative to drive the movable member 52 to move. The driving member 57 is formed with a plurality of the driving surfaces 571, where the number of the plurality of driving surfaces 571 is equal to that of the movable members 52.

When the clutch 50a is in the drive state, as illustrated in FIG. 12, the driving surface 571 is operative to drive the movable member 52 to rotate in the direction indicated by arrow, that is, the movable member 52 rotates clockwise. When in the locked position, the movable member 52 is in contact with both the driving surface 571 and the mounting groove 561, thus driving the transmission member 56 to rotate.

When in the unlocked position, the movable member 52 is free of contact with at least one of the driving surface 571 or the groove wall 562 of the mounting groove 561. That is, when in the unlocked position, the movable member 52 cannot be in contact with both the driving surface 571 and the groove wall 562 of the mounting groove 561. When the wheel 30 drives the transmission member 56 to rotate, the driving member 57 remains stationary, the rotation of the wheel 30 does not drive the motor shaft 41 to rotate, and the wheel 30 is able to rotate freely.

When the clutch 50a is in the drive state, the driving surface 571 is operative to drive the movable member 52 to rotate in the first direction to drive the transmission member 56 to rotate. With reference to FIG. 12, the driving surface 571 drives the movable member 52 to rotate clockwise as indicated by the arrow.

Figure 13:
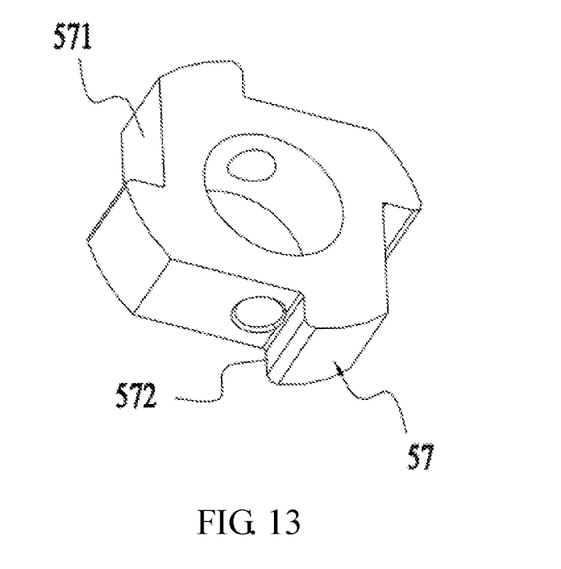
FIG. 13 is a schematic diagram illustrating a driving member of FIG. 10.

As illustrated in FIGS. 11 and 13, the driving member 57 is further formed with a stop surface 572, which stops the movable member 52 from rotating in the first direction relative to the driving member 57. The driving member 57 is formed with a plurality of stop surfaces 572, where the number of the plurality of stop surfaces 572 is equal to that of the movable members 52, and the plurality of movable members 52 are located in an area enclosed by the stop surfaces 572 and the driving surfaces 571.

As a specific example, the drive gear 54 is connected to the transmission member 56, the drive gear 54 is coupled to the transmission member 56, and the transmission member 56 is operative to drive the drive gear 54 to rotate. The wheel 30 is mounted with a driven gear 31 fixed to the wheel 30, and the driven gear 31 is fixedly connected to the wheel 30 to drive the wheel 30 to rotate.

The drive gear 54 is meshed with the driven gear 31 and is operative to drive the driven gear 31 to rotate, thereby driving the wheel 30 to rotate. The hand-propelled, self-driving, traveling machine 100 further includes a wheel cover 33, the wheel 30 is provided with a cavity in which the driven gear 31 and the drive gear 54 are disposed. The cavity is provided with an opening, which is covered by the wheel cover 33 to prevent dust from entering the cavity to contaminate the driven gear 31 and drive gear 54.

As an optional example, the driven gear may constitute a part of the wheel, namely the driven gear may be formed with the wheel, or the driven gear and the wheel are formed as a whole. Similarly, the drive gear may constitute a part of the transmission member, namely the drive gear may be formed with the transmission member, or the drive gear and the transmission member may be formed as a whole.

The transmission shaft 51 may be controlled to rotate in two different directions. Optionally, the motor 40 is an electric motor. As a specific example, the motor shaft 41 may be controlled to rotate in two different directions, and when the current passing through the motor 40 is changed to flow in an opposite direction, the motor shaft 41 would rotate in a different direction.

When the motor 40 drives the transmission shaft 51 to rotate in the first rotational direction, the transmission shaft 51 drives the wheel 30 to rotate. When the motor 40 drives the transmission shaft 51 to rotate in the second rotational direction opposite to the first rotational direction, the movable member 52 moves to the unlocked position to cause the clutch 50a to enter the unlocked state. When the motor 40 drives the transmission shaft 51 to rotate in a reverse direction, the clutch 50a is unlocked.

When in the drive state, the motor 40 drives the transmission shaft 51 to rotate in the first rotational direction. With reference to FIG. 12, the transmission shaft 51 drives the driving member 57 to rotate, and the driving surface 571 of the driving member 57 drives the movable member 56 to rotate in the first direction, referring to the direction indicated by the arrow in FIG. 12. Optionally, the first direction is the same as the first rotational direction.

When the motor 40 drives the rotation shaft 51 to rotate in the reverse direction to perform unlocking, the fixed friction member 55 keeps the position of the movable member 52 unchanged by means of the frictional force, and the transmission shaft 51 rotates in the second rotational direction to drive the driving member 57 to move relative to the movable member 52. With reference to the position illustrated in FIG. 12, the movable member 52 remains stationary, and the transmission shaft 51 rotates in a direction opposite to that indicated by the arrow, that is, counterclockwise, so that the movable member 52 moves from the locked position to the unlocked position relative to the driving member 57. At this moment, if the transmission shaft 51 continues to rotate along the second rotational direction, with reference to FIG. 11, the transmission shaft 51 rotates counterclockwise in the direction indicated by the arrow, and the stop surface 572 of the driving member 57 would come into contact with the movable member 52 and thus drive the movable member 52 to rotate along the second direction. The movable member 52 is maintained in the unlocked position, and the second direction is the same as the second rotational direction. When the motor 40 stops, the movable member 52 is maintained in the unlocked position under the action of the frictional force, the clutch is in the unlocked state, and the transmission member 56 may rotate freely relative to the transmission shaft 51, so that the wheel 30 may rotate freely; that is the wheel 30 may rotate clockwise or counterclockwise, and would not drive the motor shaft 41 to rotate.

As a specific example, when the user needs to disable the self-driving, traveling function of the hand-propelled, self-driving, traveling machine 100, namely stop the motor 40 from driving the wheel 30 to rotate, then the user may release the first trigger 42. The controller of the hand-propelled, self-driving, traveling machine 100 may control to alter the direction of the current to which the motor 40 is coupled; that is to control the motor 40 to rotate in a reverse direction for a period of time, or control the motor shaft 41 to reverse a certain angle, thereby achieving automatic unlocking.

As an optional example, the hand-propelled, self-driving, traveling machine 100 is provided with an unlocking operating member. When a differential unlocking is required, the user may operate the unlocking operating member to control the motor to reverse for a period of time to achieve the unlocking.

The foregoing has illustrated and described the basic principles, main features and advantages of the present disclosure. Those having ordinary skill in the art will appreciate that the foregoing examples will not restrict the present disclosure in any form, and any technical solutions obtained by means of equivalent substitution or equivalent transformation shall all fall in the scope of protection of the present disclosure.

What is claimed is:

1. A hand-propelled, self-driving, traveling machine, comprising:
   a chassis;
   a handle, connected to the chassis;
   a wheel, configured to support the chassis and rotatable relative to the chassis;
   a motor, comprising a motor shaft configured for driving the wheel to rotate;
   a transmission shaft, driven to rotate by the motor shaft; and
   a clutch that enables transmission between the wheel and the transmission shaft;
   wherein the clutch provides a drive state in which the transmission shaft is operative to drive the wheel to rotate and an unlocked state in which the wheel is rotatable relative to the transmission shaft and the clutch comprises:

a driving member, combined with the transmission shaft or constituting a part of the transmission shaft, configured to rotate synchronously with the transmission shaft;

a movable pin, movable relative to the driving member between a locked position in which the clutch is in the drive state and an unlocked position in which the clutch is in the unlocked state;

a transmission member, connected to the wheel and configured to drive the wheel to rotate;

a movable friction member, provided with a limiting slot, wherein the movable pin is partially disposed in the limiting slot and is rotatable synchronously with the movable friction member; and a fixed friction member, fixed to the chassis or constituting a part of the chassis, wherein the fixed friction member is in a frictional contact with the movable friction member.

2. The hand-propelled, self-driving, traveling machine of claim 1, wherein the transmission member is provided with a mounting groove, the driving member and the movable pin are disposed in the mounting groove, the driving member is formed with a driving surface that is in contact with the movable pin and operative to drive the movable pin to move, when the movable pin is in the locked position, the movable pin is in contact with both the driving surface and a groove wall of the mounting groove, and, when the movable pin is in the unlocked position, the movable pin is free of contact with the driving surface, or the groove wall of the mounting groove, or with both the driving surface and the groove wall of the mounting groove.

3. The hand-propelled, self-driving, traveling machine of claim 1, wherein the driving member is formed with a driving surface configured for driving the movable pin to rotate in a first direction, and is further formed with a stop surface configured for stopping the movable pin from rotating relative to the driving member in the first direction.

4. The hand-propelled, self-driving, traveling machine of claim 1, wherein the limiting slot is configured to guide the movable pin to move in a radial direction around a rotational axis of the driving member.

5. The hand-propelled, self-driving, traveling machine of claim 1, comprising two of the clutches, which are arranged at two ends of the transmission shaft.

6. The hand-propelled, self-driving, traveling machine of claim 1, further comprising an elastic member configured for applying a force to the movable friction member to drive the movable friction member to come into contact with the fixed friction member.

7. The hand-propelled, self-driving, traveling machine of claim 6, wherein the elastic member is disposed between the movable friction member and the driving member.

8. The hand-propelled, self-driving, traveling machine of claim 1, wherein the fixed friction member is sleeved onto an outer periphery of the transmission shaft.

9. The hand-propelled, self-driving, traveling machine of claim 1, wherein the wheel is formed with or connected to a driven gear, the transmission member is formed with or connected to a drive gear, and the drive gear is meshed with the driven gear.

10. The hand-propelled, self-driving, traveling machine of claim 1, further comprising a second motor, mounted onto the chassis and a working accessory driven by the second motor to perform a tool function.

11. The hand-propelled, self-driving, traveling machine of claim 1, further comprising a working accessory driven by the motor to perform a tool function.

12. The hand-propelled, self-driving, traveling machine of claim 1, wherein the transmission shaft is operative to be controlled to rotate in two different directions, in response to the motor driving the transmission shaft to rotate in a first rotational direction, the transmission shaft is operative to drive the wheel into rotation, and, in response to the motor driving the transmission shaft to rotate in a second rotational direction opposite to the first rotational direction, the movable member is operative to move to the unlocked position causing the clutch to enter the unlocked state.

13. A hand-propelled, self-driving, traveling machine, comprising:

a chassis;

a handle, connected to the chassis;

a wheel, configured to support the chassis and rotatable relative to the chassis;

a motor, comprising a motor shaft configured for driving the wheel to rotate; and a clutch, disposed between the wheel and the motor shaft;

wherein the clutch provides a drive state in which the motor shaft is operative to drive the wheel to rotate and an unlocked state in which the wheel is rotatable relative to the motor shaft and the clutch comprises:

a movable member, movable between a locked position in which the clutch is in the drive state and an unlocked position in which the clutch is in the unlocked state; and a fixed friction member, fixed to or constituting a part of the chassis;

wherein, when the clutch is in the unlocked state, the fixed friction member is operative to keep the movable member in the unlocked position by a frictional force, when the clutch is in the drive state, the motor shaft outputs a force that drives the movable member to rotate and that is greater than the frictional force exerted by the fixed friction member on the movable member, and the motor shaft is operative to drive the movable member to rotate relative to the fixed friction member.

14. The hand-propelled, self-driving, traveling machine of claim 13, further comprising a movable friction member, wherein the movable member is movably mounted onto the movable friction member, and the fixed friction member is in a frictional contact with the movable friction member.

15. The hand-propelled, self-driving, traveling machine of claim 14, further comprising an elastic member configured for applying a force to the movable friction member to drive the movable friction member to come into contact with the fixed friction member.

16. The hand-propelled, self-driving, traveling machine of claim 15, wherein the movable friction member is arranged between the fixed friction member and the elastic member.

17. The hand-propelled, self-driving, traveling machine of claim 15, wherein the elastic member is a spiral spring, the clutch comprises a plurality of the movable members, and the plurality of the movable members are disposed to surround the elastic member.

18. The hand-propelled, self-driving, traveling machine of claim 14, wherein the clutch comprises a plurality of the movable members and the plurality of movable members are movably mounted onto the movable friction member.

19. The hand-propelled, self-driving, traveling machine of claim 18, further comprising a transmission shaft, driven by the motor shaft to rotate and wherein the clutch further comprises a driving member, combined with or constituting a part of the transmission shaft, configured to rotate synchronously with the transmission shaft and a transmission member, connected to the wheel and configured to drive the wheel to rotate, provided with a mounting groove, the driving member and the movable member are disposed in the mounting groove, the driving member is formed with a driving surface that is in contact with the movable member and operative to drive the movable member to move, when the movable member is in the locked position, the movable member is in contact with both the driving surface and a groove wall of the mounting groove, and, when the movable member is in the unlocked position, the movable member is free of contact with the driving surface, or the groove wall of the mounting groove, or with both the driving surface and the groove wall of the mounting groove.

20. The hand-propelled, self-driving, traveling machine of claim 19, wherein the driving member is formed with a driving surface configured for driving the movable member to rotate in a first direction and a stop surface configured for stopping the movable member from rotating relative to the driving member in the first direction.

\* \* \* \* \*